(12) United States Patent
Visintin et al.

(10) Patent No.: US 10,707,730 B2
(45) Date of Patent: Jul. 7, 2020

(54) STRIPPING TOOL FOR REMOVING A CONDUCTOR BAR FROM AN ELECTRIC MACHINE

(71) Applicant: General Electric Technology GmbH, Baden (CH)

(72) Inventors: Massimilano Visintin, Baden (CH); Erminio Merati, Sesto San Giovanni (IT); Laurent Terrade, Belfort (FR); Luigi Cattaneo, Milan (IT); Laurent Didier Clemence, Belfort (FR)

(73) Assignee: General Electric Technology GmbH, Baden (CH)

( * ) Notice: Subject to any disclaimer, the term of this patent is extended or adjusted under 35 U.S.C. 154(b) by 172 days.

(21) Appl. No.: 15/410,805

(22) Filed: Jan. 20, 2017

(65) Prior Publication Data

US 2017/0214302 A1   Jul. 27, 2017

(30) Foreign Application Priority Data

Jan. 22, 2016   (EP) ..................................... 16290018

(51) Int. Cl.
*H02K 15/00* (2006.01)
*H02K 15/04* (2006.01)

(52) U.S. Cl.
CPC ..... *H02K 15/0006* (2013.01); *H02K 15/0414* (2013.01)

(58) Field of Classification Search
CPC ........................ H02K 15/0006; H02K 15/0414
See application file for complete search history.

(56) References Cited

U.S. PATENT DOCUMENTS

| | | | | |
|---|---|---|---|---|
| 3,010,191 A | * | 11/1961 | McCullough | B25B 27/026 269/109 |
| 4,030,705 A | | 6/1977 | Bontrager | |
| 4,621,850 A | * | 11/1986 | Wiersema | H02K 15/0006 29/762 |
| 5,001,828 A | * | 3/1991 | Missman | H02K 15/0006 29/252 |

(Continued)

FOREIGN PATENT DOCUMENTS

| | | |
|---|---|---|
| DE | 36 35 115 A1 | 4/1988 |
| EP | 2 683 064 A1 | 1/2014 |
| JP | 09046982 A * | 2/1997 |

OTHER PUBLICATIONS

Extended European Search Report and Opinion issued in connection with corresponding EP Application No. 16290018.7 dated Jun. 21, 2016.

*Primary Examiner* — Peter Dungba Vo
*Assistant Examiner* — Jeffrey T Carley
(74) *Attorney, Agent, or Firm* — Theodoros Stamatiadis; Hoffman Warnick LLC

(57) ABSTRACT

The present disclosure relates to a stripping tool, and an arrangement for stripping a conductor bar from a slot of a core of an electric machine. The disclosure provides a device to facilitate the removal of a conductor bar out of a slot of an electric machine. A stripping tool is described with a piston and a support to apply the piston to the core, a rope to be wound around the conductor bar, and a puller suitable to move the rope vertically to the core to pull the conductor bar out of the slot by means of the rope.

8 Claims, 2 Drawing Sheets

(56) References Cited

U.S. PATENT DOCUMENTS

| | | | | |
|---|---|---|---|---|
| 5,517,750 | A * | 5/1996 | Eddy | H02K 15/0006 29/426.3 |
| 5,806,170 | A * | 9/1998 | Noshita | H02K 15/0006 29/596 |
| 8,245,386 | B2 | 8/2012 | Dailey et al. | |
| 8,745,834 | B2 | 6/2014 | Ford et al. | |
| 8,959,754 | B2 * | 2/2015 | Ali | H02K 15/0006 29/281.3 |
| 2004/0034989 | A1 * | 2/2004 | Jonas | H02K 15/0006 29/596 |
| 2008/0092374 | A1 * | 4/2008 | Fayewicz | H02K 15/0006 29/729 |
| 2009/0255104 | A1 * | 10/2009 | Gillivan | F01D 25/285 29/426.1 |
| 2009/0265910 | A1 * | 10/2009 | Vallarino | H02K 15/0006 29/426.4 |
| 2012/0073118 | A1 * | 3/2012 | Bywaters | H02K 7/1838 29/596 |
| 2012/0247287 | A1 * | 10/2012 | Visintin | B23D 57/0007 83/13 |
| 2014/0345384 | A1 | 11/2014 | Nguyen | |
| 2016/0285348 | A1 * | 9/2016 | Klejc | H02K 15/0006 |

* cited by examiner

STRIPPING TOOL FOR REMOVING A CONDUCTOR BAR FROM AN ELECTRIC MACHINE

TECHNICAL FIELD

The present disclosure relates to a stripping tool, a method to strip a conductor bar, and an arrangement for stripping a conductor bar from a slot of a core of an electric machine.

The electric machine is, in particular, a rotating electric machine such as a synchronous generator to be connected to a gas or steam turbine (turbogenerator) or a synchronous generator to be connected to a hydro turbine (hydro generator) or an asynchronous generator or a synchronous or asynchronous electric motor or also other types of electric machines.

BACKGROUND

Electrically conductive windings are composed to electric coils in electric machines. These coils or windings are made from conductor bars from copper usually. The conductor bars are placed in slots in the core of the rotor or stator of the electric machine. In maintenance and repair of huge electric machines damaged conductor bars of the windings are replaced or repaired. The removal however is complicated as the heavy conductor bars, which are several meters in length, are tightly connected and firmly fixed to the walls of the slots after long term operation. Contaminations in the slot further impede the removal of conductor bars. Commonly, this work is done by workers who cut the conductor bars out of the slots with several tools in a long lasting maintenance effort.

BRIEF DESCRIPTION

It is an object of the invention to provide a device and a method to facilitate the removal of a conductor bar out of a slot of an electric machine.

This object is solved with the features of a stripping tool, a method to strip a conductor bar, and an arrangement for stripping a conductor bar according to the present disclosure. The described stripping tool, method to strip, and arrangement provide for an easy, cheap, save, and fast solution for stripping a conductor bar from a slot.

Further examples of the invention are disclosed herein.

In an example of the invention the puller of the stripping tool is driven by hydraulics or pneumatics. A hydraulic or pneumatic device provides the appropriate lifting or stripping force to the conductor bar.

In a further example the puller is designed as a massive tube slidable along the piston with a bolt projecting from the puller. The rope is wound around the bolt to pull the conductor bar out of the slot by means of the rope. This structure of a stripping tool enables an easy and reliable removal of a conductor bar from the slot.

In a further example the stripping tool comprises at least a displacement sensor to determine the position of the conductor bar in the slot. The displacement sensor transfers the data regarding the position of the conductor bar to a controller via a signal line. The controller steers the stripping or pulling force exerted to the conductor bar in dependency of the position of the conductor bar. By this means the stripping force is reduced the more the conductor bar is stripped away from the slot with a maximum force at the start. By this means a secure removal of the conductor bar is guaranteed, a damage to the conductor bar, the slot and the stripping tool is avoided.

BRIEF DESCRIPTION OF THE DRAWINGS

Further characteristics and advantages will be more apparent from the description of a non-exclusive embodiment of a stripping tool, a method to strip a conductor bar, and an arrangement to strip a conductor bar illustrated by way of non-limiting example in the accompanying drawings, in which.

DETAILED DESCRIPTION OF EXEMPLARY EMBODIMENTS

Figure 1:
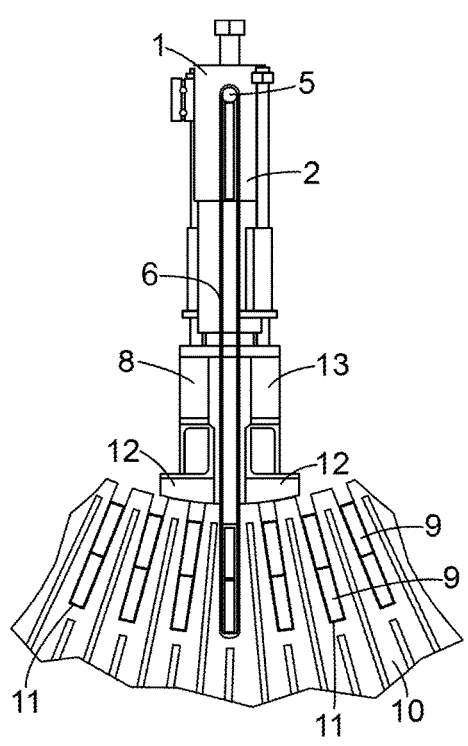
FIG. 1 shows a schematic front view of a stripping tool according to an example of the invention applied to a core of a stator of an electric machine, with a rope wound around a conductor bar housed in a slot of the core.

With reference to the figures, these show a stripping tool 1 and an arrangement with a series of stripping tools 1, wherein like reference numerals designate identical or corresponding parts throughout the several views.

FIG. 1 shows a schematic front view of a stripping tool 1 according to an example of the invention. The stripping tool 1 comprises a piston 7 and a puller 2 arranged around the piston 7. The stripping tool 1 has a longitudinal dimension. The piston 7 is designed massive, the puller 2 is designed as a massive tube which is shiftable along the piston 7 to change the length of the stripping tool 1. A bolt 5 is mounted to the puller 2 and projects perpendicularly from the puller 2. Around the bolt 5 a rope 6 is strained. This rope 6 can be any tear-resistant thread or strand with a thin diameter to fit into the gap between the slot 11 and the conductor bar 9. The rope 6 can also be designed as a wire. The stripping tool 1 has a support 8 which comprises an annular shoe 12 to adjoin the core 10 as shown in FIG. 1. The core 10 is illustrated in the FIGS. in a cut front view of a small part of the core 10. In this perspective the conductor bars 9 project into the image plane.

The stripping tool 1 is surrounded by the complete stator core 10. The support 8 of the stripping tool 1 has further a middle section 13 which connects the shoe 12 and the piston 7. The middle section 13 serves as a support for the piston 7 and as a frame for the rope 6 and stabilizes the stripping tool 1. The shoe 12 has a shape at the downside which is adjusted to the bending of the core 10 as the inside of the core 10 is concave. When operated an unshiftable connection between the stripping tool 1 and the core 10 is created by means of the shoe 12. The rope 6 clutched around the bolt 5 at one end is clutched around a conductor bar 9 at the other end which is housed in one of the slots 11 of the core 9. Therefore, the stripping tool 1 and the conductor bar 9 are bound together with a specific tension to secure the stripping tool 1 to the inner face of the core 10. To the end of winding the rope 6 around the conductor bar 9 the rope 6 is guided by a connected thin stick which is suitable to pass through the small gap between slot 11 and conductor bar 9 to the bottom of the slot 11. There, the thin stick unfolds with the rope 6 in a horizontal direction to the other side of the conductor bar 9. The thin stick with rope 6 is grabbed by a different tool from the other side of the conductor bar 9 and pulled upwards along and around the conductor bar 9 within the small gap, as is shown in FIG. 1.

Shown in FIG. 1 is the status of stripping a conductor bar 9 before the stripping tool 1 is activated with the stripping tool 1 arranged to the core 10 and the rope 6 wrapped around the conductor bar 9 in the slot 11 as described. Next, the puller 2 is activated by a controller 15 operated by an operator of the stripping tool 1 via a signal line 16. The controller 15 is part of an assigned computer. Alternatively, the stripping tool 1 is activated by the operator on site directly at the stripping tool 1. In each case a pneumatic or hydraulic device assigned to the puller 2 or integrated into the stripping tool 1 drives the puller 2. The pneumatics or hydraulics are suitable to exert a pulling force to the conductor bar 9 sufficient to move the conductor bar 9. The pulling force causes the puller 2 to move relatively to the piston 7 of the stripping tool 1. By this the puller 2 with the bolt 5 is shifted in the vertical direction. The rope 6 wound around the bolt 5 and the conductor bar 9 moves the conductor bar 9 in a vertical direction accordingly when the friction force is overcome. This status is shown in FIG. 2 where the puller 2 is pushed upwards and lifts the conductor bar 9 upwards by a specific extent.

The stripping tool 1 comprises at least a displacement sensor 14 to determine the position of the conductor bar 9 in the core 10. The displacement sensor 14 is arranged at the inner wall of the slot 11. The displacement sensor 14 measures the position of the conductor bar 9 and transfers this information to the connected controller 15. The displacement sensor 14 can be designed as an optical sensor to gather the information whether the conductor bar 9 captures the space in the slot 11 or not. Other sensor types are useable, e.g. contact sensors sensing the contact between the displacement sensor 14 and the conductor bar 9. In an example the position of the conductor bar 9 is measured continuously in each slot 11 by means of a series of displacement sensors 14.

Figure 2:
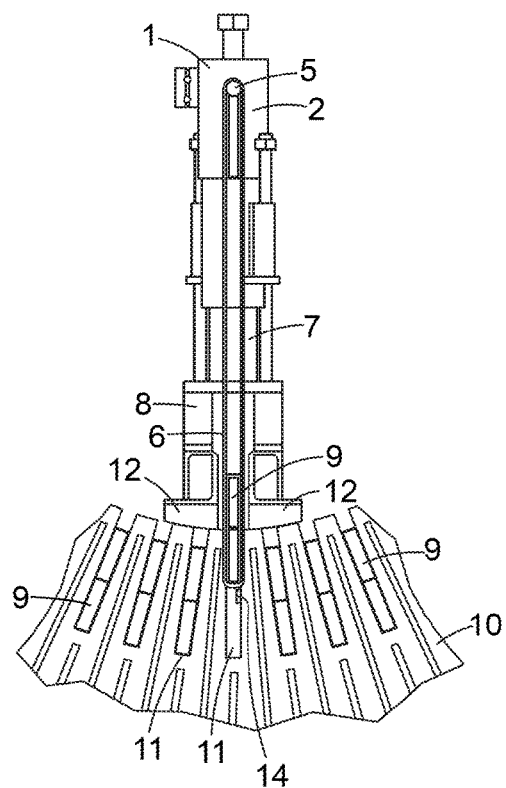
FIG. 2 shows a schematic front view similar to FIG. 1, with a puller pulled upwards along a piston of the stripping tool and the conductor bar partly pulled out of the slot.

In FIG. 2 for sake of illustration only one displacement sensor 14 is shown, several further displacement sensors 14 are provided at different areas in the slot 11. In dependence of the position of the conductor bar 9 and the extent the conductor bar 9 is lifted the force exerted by the stripping tool 1 can be adjusted. The controller 15 steers the stripping tool 1 in this manner. When the conductor bar 9 reaches a position according to FIG. 2 for example the force exerted via the rope 6 is reduced. At first when the conductor bar 9 is completely housed in the slot 11 the force is high to release the conductor bar 9 from the slot 11 initially. Step by step the force is reduced as the conductor bar 9 is lifted more and more. The pulling force is adjusted in dependency of the position of the conductor bar 9. Finally, the conductor bar 9 is removed from the slot 11 completely. The conductor bar 9 is then positioned in the support 8 and the puller 2 reaches the highest position. The conductor bar 9 is removed from the stripping tool 1 in a next working step and the conductor bar 9 is released from the rope 6.

Figure 3:
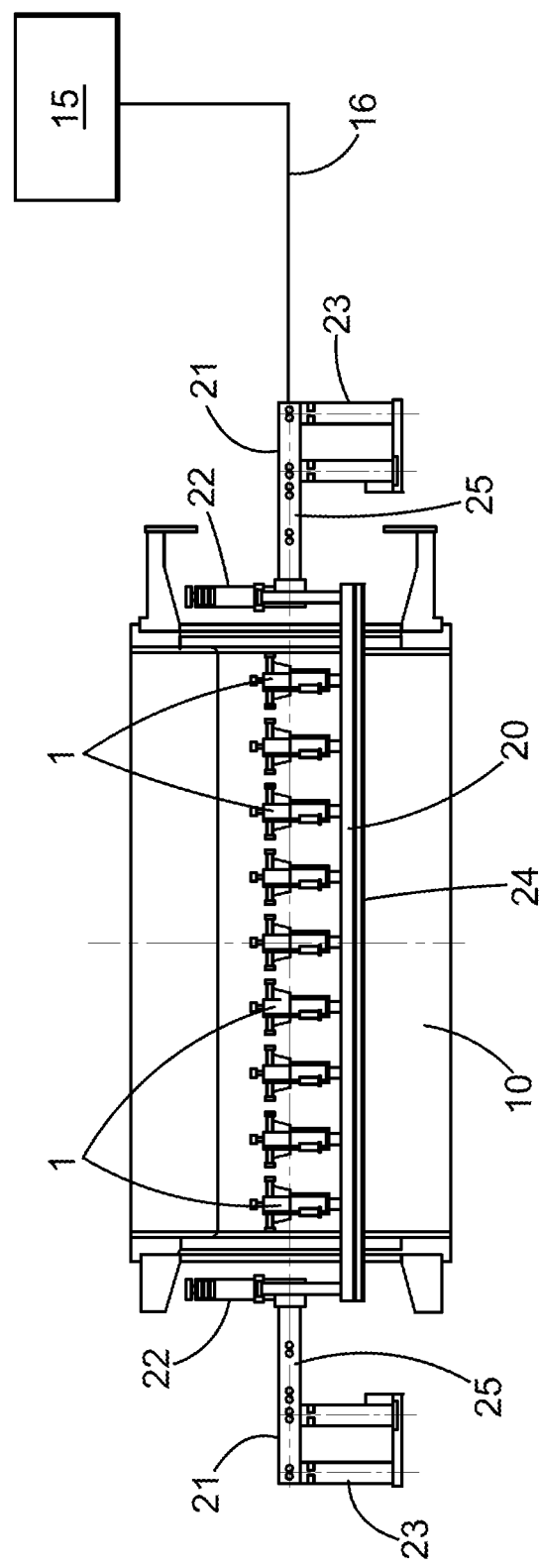
FIG. 3 shows a schematic side view of an arrangement for stripping a conductor bar according to an example of the invention with a series of stripping tools surrounded by a frame to support the stripping tools.

FIG. 3 shows a schematic side view of an arrangement 20 for stripping a conductor bar 9 according to an example of the invention. The arrangement 20 is deployed at the core 10 of a stator of an electric machine which is shown cut. The arrangement 20 comprises a frame 21 and rods 22 connected to support a series of stripping tools 1 as described above. The frame 21 projects lengthwise through the core 10 and has a pillar 23 on each end which securely rest on the ground. The rods 22 at each end of the frame 21 carry a rail 24 at which the series of stripping tools 1 is fixed. Here, nine stripping tools 1 are comprised by the arrangement 20. In an embodiment, the arrangement 20 comprises more than five stripping tools 1 and up to twelve stripping tools 1. The rods 22 have an adjustable height along arms 25 of the frame 21 to properly position the rail 24 with the stripping tools 1 at the slot 11 in the core 10. The adjustment of the frame 21 at the slot 11 as shown in FIGS. 1 and 2 is done by the operator or alternatively automatically and controlled by the controller 15. The installation of the arrangement 20 in the core 10 is done by the operators. The stripping tools 1 are applied along a length of a slot 11 and each rope 6 is wound around the conductor bar 9. Thus, the ropes 6 enclose the conductor bar 9 at several points. This measure is used to strip a heavy conductor bar 9 with a length of several meters. The lifting and stripping of the conductor bar 9 is performed as described above. The controller 15 is electrically connected to all stripping tools 1 via the signal line 16 and controls the stripping process as well as the force applied to each of the stripping tools 1. The conductor bar 9 is by these means stripped evenly from the slot 11 to avoid damaging of involved parts and to accelerate the stripping process.

In particular, the stripping force of all stripping tools 1 along the conductor bar 9 is evenly distributed to prevent deformations of the conductor bar 9. The conductor bar 9 is not equally bonded in the slot 11 along its length. Therefore, the controller 15 carefully controls the individual stripping tools 1 in a manner that the conductor bar 9 is detached from the slot surface without deformation. Displacement sensors 14 in different parts of the slot 11 make the even removal of the conductor bar 9 along the length of the slot 11 feasible. A signal from a displacement sensor 14 indicating to the controller 15 that the conductor bar 9 has reached a specific position triggers the controller 15 to stop or reduce the stripping force at the corresponding stripping tool 1 acting on this area. The stop or reduction of stripping force is upheld as long as other displacement sensors 14 at other parts of the corresponding slot 11 measure a different height position. When all displacement sensors 14 in the different spots of the slot 11 signal the same position within a specific bandwidth then all stripping tools 1 are activated by the controller 15.

All stripping tools 1 exert a stripping force to the conductor bar 9 then at all areas at which the stripping tools 1 are mounted. When one or more displacements sensors 14 signal an overshoot of a threshold value in relation to the other displacement sensors 14 then the assigned stripping tools 1 at these spots are instructed to stop or reduce the stripping force by the controller 15. With the provision of several displacement sensors 14 assigned to each stripping tool 1 any fine-tuning of the stripping force control is realized. The described automatic control by the controller 15 is predominant against the manual adjustment which is done by several operators. The manual adjustment of the applied force of the individual stripping tools 1 in dependency to each other and in dependency to the extent of removal of the conductor bar 9 in a specific area requires a higher working effort. This manual stripping is done by appearance and manual measurement along the conductor bar 9 to be stripped.

While the invention has been described in detail with reference to exemplary embodiments thereof, it will be apparent to one skilled in the art that various changes can be made, and equivalents employed, without departing from the scope of the invention. The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents.

What is claimed is:

1. A stripping tool for removing a conductor bar out of a slot of a core of an electric machine, comprising:
    a piston;
    a support configured to apply the piston to the core;
    a rope to be wound around the conductor bar; and
    a puller configured to move the rope vertically to the core to pull the conductor bar out of the slot with the rope.

2. The stripping tool according to claim 1, wherein the puller is driven by hydraulics or pneumatics.

3. The stripping tool according to claim 1, wherein the puller is designed as a massive tube slidable along the piston with a bolt projecting from the puller, the rope wound around the bolt and the bolt configured to pull the conductor bar out of the slot with the rope.

4. The stripping tool according to claim 1, wherein the stripping tool further comprises a displacement sensor configured to determine the position of the conductor bar in the slot.

5. The stripping tool according to claim 4, wherein the stripping tool further comprises a controller configured to control the pulling force at the rope and to adjust the pulling force in dependency of the position of the conductor bar.

6. The stripping tool according to claim 1, wherein the support comprises a shoe configured to adjoin the core, the shoe having a shape adjustable to the bending of the core to create an unshiftable connection between the stripping tool and the core during operation of the stripping tool.

7. An arrangement for stripping a conductor bar, comprising a series of stripping tools according to claim 1 arranged in a frame.

8. The arrangement according to claim 7, wherein the frame comprises a rod at each end slidable along an arm of the frame to position the stripping tools at the slot of the core.

* * * * *